(12) United States Patent
Lai

(10) Patent No.: US 9,367,221 B2
(45) Date of Patent: Jun. 14, 2016

(54) SYSTEM AND METHOD FOR SEQUENCING ROTATABLE IMAGES

(71) Applicant: Ken Lai, Aliso Viejo, CA (US)

(72) Inventor: Ken Lai, Aliso Viejo, CA (US)

( * ) Notice: Subject to any disclaimer, the term of this patent is extended or adjusted under 35 U.S.C. 154(b) by 232 days.

(21) Appl. No.: 14/016,165

(22) Filed: Sep. 2, 2013

(65) Prior Publication Data

US 2015/0067499 A1 Mar. 5, 2015

(51) Int. Cl.
| | | |
|---|---|---|
| *G06F 3/0484* | (2013.01) | |
| *G06F 3/0481* | (2013.01) | |
| *G11B 27/34* | (2006.01) | |
| *G02B 27/22* | (2006.01) | |

(52) U.S. Cl.
CPC ........ *G06F 3/04845* (2013.01); *G06F 3/04815* (2013.01); *G11B 27/34* (2013.01); *G02B 27/2292* (2013.01)

(58) Field of Classification Search
CPC ... G06F 3/0482; G06F 17/50; G06F 3/04815; G06F 3/16; G06F 1/1626; G06F 3/04883; G06F 2200/1637
See application file for complete search history.

(56) References Cited

U.S. PATENT DOCUMENTS

| | | | | |
|---|---|---|---|---|
| 6,047,130 | A * | 4/2000 | Oles ................................. | 396/1 |
| 6,072,898 | A * | 6/2000 | Beaty et al. .................... | 382/146 |
| 6,556,201 | B1 * | 4/2003 | Maehara et al. .............. | 345/427 |
| 7,168,809 | B2 * | 1/2007 | Hoshino et al. .................. | 353/7 |
| 9,298,972 | B2 * | 3/2016 | Kunieda ............... | G06K 9/6257 |
| 2002/0105529 | A1 * | 8/2002 | Bowser .............. | G06F 3/04815 345/629 |
| 2002/0145660 | A1 * | 10/2002 | Kanade ................... | G03B 41/00 348/36 |
| 2004/0170327 | A1 * | 9/2004 | Kim ................... | G06F 17/30259 382/217 |
| 2005/0195216 | A1 * | 9/2005 | Kramer et al. ................ | 345/619 |
| 2008/0297593 | A1 * | 12/2008 | Debevec ............. | G02B 27/225 348/51 |
| 2009/0309975 | A1 * | 12/2009 | Gordon et al. ................ | 348/159 |
| 2011/0025597 | A1 * | 2/2011 | Lee ............................. | 345/156 |
| 2011/0239161 | A1 * | 9/2011 | Kuhn et al. .................... | 715/825 |
| 2012/0020559 | A1 * | 1/2012 | Deng ................. | G06K 9/00711 382/173 |

OTHER PUBLICATIONS

Burns et al., View Variation of Point-Set and Line-Segment Features; © 1992; IEEE; 18 pages.*
Jiang et al., Outward-Looking Circular Motion Analysis of Large Image Sequences, © 2005, IEEE; 7 pages.*

* cited by examiner

*Primary Examiner* — Linh K Pham
(74) *Attorney, Agent, or Firm* — John D. Tran; Rhema Law Group

(57) ABSTRACT

A system and method for sequencing rotatable images are disclosed. In at least one embodiment, an image database contains an at least one image collection comprising a plurality of view sets. The view sets each comprise a parallel sequence of images that depicts the same sequentially formatted subject matter as the other view sets in the image collection, but from a unique common perspective point. A unique view index is assigned to each view set in the at least one image collection, while a unique frame index is assigned to each image within each view set. Using these view and frame indices, the content module allows the user to dynamically and selectively choose the common perspective point at which to view the sequentially formatted subject matter at any step in the sequence of images, thereby providing a 360 degree, selectively rotatable view of the subject matter.

11 Claims, 3 Drawing Sheets

SYSTEM AND METHOD FOR SEQUENCING ROTATABLE IMAGES

RELATED APPLICATIONS

Not applicable.

INCORPORATION BY REFERENCE

Applicant(s) hereby incorporate herein by reference any and all patents and published patent applications cited or referred to in this application.

BACKGROUND OF THE INVENTION

1. Field of the Invention

Aspects of this invention relate generally to image rendering, and more particularly to a system and method for sequencing rotatable images.

2. Description of Related Art

By way of some background, many technologies currently exist for enhancing the way images are rendered, both on the Internet and elsewhere, in order to provide additional detail and clarity to said images. Examples of such technologies include high-definition zooming and rotating of static images. However, in contexts where the subject matter of a static image is depicted in a series of images (such as in the context of Internet-based tutorials designed to visually convey or teach a desired skill in a step-by-step format, for example), discrepancies may arise between successive images if those images do not depict the subject matter from a consistent point of perspective (i.e., if the image views are disjointed)—which may occur if the user were to selectively rotate an image before moving to a subsequent (or previous) image in the sequence. Such discrepancies may cause confusion and seriously hinder the effectiveness of such a series of images.

Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a system and method for sequencing rotatable images. In at least one embodiment, an image database is implemented in memory on an at least one computing device. The image database contains an at least one image collection comprising a plurality of view sets. The view sets each comprise a parallel sequence of images that depicts the same sequentially formatted subject matter as the other view sets in the image collection, but from a unique common perspective point. A view index is assigned to each view set in the at least one image collection, with each view index being unique as compared to all other view sets in the associated image collection. A frame index is assigned to each image within each view set, with each frame index being unique as compared to all other images in the associated view set. A content module is implemented in memory on an at least one computing device, the content module being configured for selectively accessing and displaying images stored in the image database. An at least one user is capable of accessing and interacting with the images displayed by the content module using an at least one client device in selective communication with the content module. Upon the user choosing to rotate the perspective point of the image being displayed, the content module obtains the view index corresponding to the newly selected perspective point and displays the image associated with the current frame index located in the view set associated with the new view index. Similarly, upon the user choosing to display a different image in the view set, the content module obtains the frame index corresponding to the newly selected image to be displayed and displays the image associated with the new frame index located in the view set associated with the current view index. Thus, the user is capable of dynamically and selectively choosing the common perspective point at which to view the sequentially formatted subject matter at any point in the sequence of images, thereby providing a 360 degree, selectively rotatable view of the subject matter.

A primary objective inherent in the above described apparatus and method of use is to provide advantages not taught by the prior art.

Another objective is to provide such a system and associated methods that are capable of allowing a user to dynamically and selectively choose the horizontal and/or vertical angle at which they wish to view a given sequence of images at any point during the sequence, thereby providing the user with a 360 degree, selectively "rotatable" view of the subject matter depicted in the sequenced images.

Another objective is to provide such a system and associated methods that are capable of synchronizing the images in a sequence to match a chosen view of the subject matter depicted in the sequenced images.

Another objective is to provide such a system and associated methods that are capable of being used in substantially any context where the need for such sequencing of rotatable images exists.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

Figure 1:
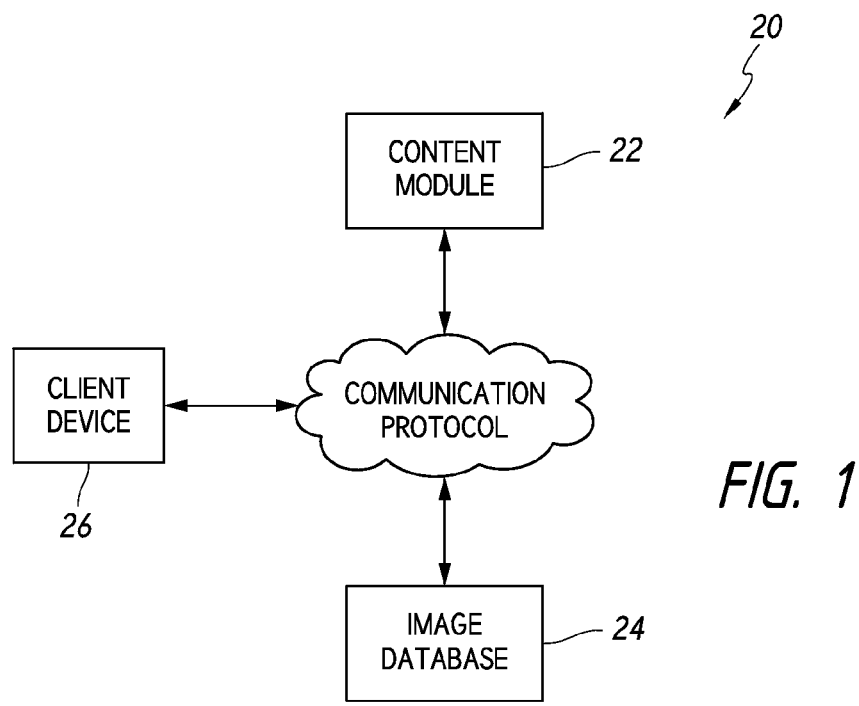
FIG. 1 is a simplified schematic view of an exemplary system for sequencing rotatable images, in accordance with at least one embodiment.

Turning now to FIG. 1, there is shown a simplified schematic view of an exemplary system 20 for sequencing rotatable images, in accordance with at least one embodiment. The system 20 provides, in at least one embodiment, a content module 22 and an image database 24 each in selective communication with one another and residing in memory on an at least one computing device. It should be noted that the term "memory" is intended to include any type of electronic storage medium (or combination of storage mediums) now known or later developed, such as local hard drives, RAM, flash memory, external storage devices, network or cloud storage devices, etc. Additionally, an at least one client device 26 (itself a computing device in the possession of a user) is also in selective communication with at least the content module 22. The term "computing device" is intended to include any type of computing device now known or later developed, such as desktop computers, smartphones, laptop computers, tablet computers, etc. In still further embodiments, one or both of the content module 22 and image database 24 reside locally in memory on the client device 26.

At the outset, it should be noted that the means for allowing communication between each of the content module 22, image database 24, and at least one client device 26 may be any wired- or wireless-based communication protocol (or combination of protocols) now known or later developed. As such, the present invention should not be read as being limited to any one particular type of communication protocol, even though certain exemplary protocols may be mentioned herein for illustrative purposes.

With continued reference to FIG. 1, in at least one embodiment, the image database 24 is configured for selectively storing an at least one image collection 28 containing a plurality of parallel sequences of images 30 depicting common subject matter, as discussed further below. Additionally, the content module 22 is configured for selectively accessing and displaying the images 30 stored in the image database 24. Specifically, in the exemplary embodiment, the content module 22 hosts an at least one Internet-based website (through which the images 30 are selectively displayed) accessible by the client device 26 via a web browser (or similar application) residing on the client device 26, as discussed further below.

In the exemplary embodiment, and for illustrative purposes, the system 20 is utilized in connection with Internet-based tutorials designed to visually teach the user desired skills in a step-by-step format, such as how to properly swing a golf club, for example. At the outset, it should be noted that, in further embodiments, the system 20 may be utilized in any other context, online or offline, now known or later developed, where the need for such sequencing of rotatable images exists. As such, the present invention should not be read as being limited to only Internet-based tutorials.

Figure 2:
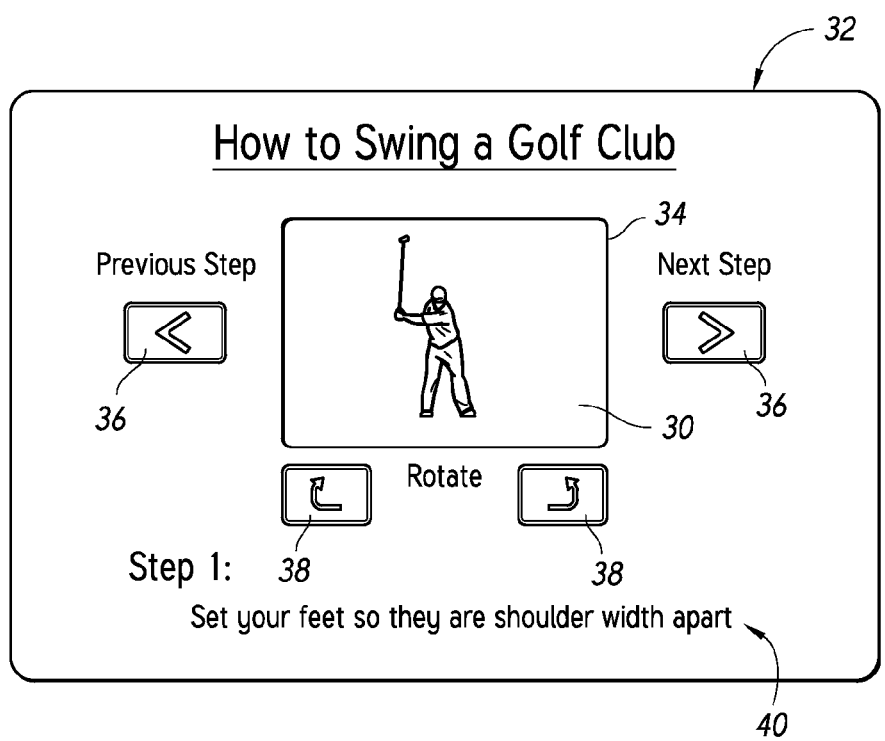
FIG. 2 is an exemplary illustration of an Internet browser or similar application window depicting an exemplary user interface, as displayed by an exemplary computing device, in accordance with at least one embodiment.

FIG. 2 shows an exemplary illustration of a user interface 32 in accordance with at least one embodiment, as hosted by the content module 22 and displayed via a web browser or similar application window on the screen of the client device 26. In a bit more detail, the user interface 32 provides, in at least one embodiment, an image window 34 configured for displaying selected images 30 stored in the image database 24, an at least one image navigation button 36 configured for allowing the user (via the client device 26) to selectively traverse through the images 30 stored in the image database 24, an at least one image rotation button 38 configured for allowing the user (via the client device 26) to selectively rotate the view angle of the subject matter depicted in the image 30 displayed in the image window 34 (as discussed further below), and additional information related to each image 30. In the exemplary online tutorial embodiment, such additional information includes instructional content 40—which may include audio and/or visual components (i.e., audio, video, text, graphics, etc.)—designed to assist in conveying the subject matter depicted in the associated image 30. It should be noted that the user interface 32 shown in FIG. 2 and described herein is merely exemplary and used solely for illustrative purposes. As such, in further embodiments, the user interface 32 may provide more or less elements, so long as the system 20 is capable of substantially carrying out the image rotation functionality herein described.

Figure 3:
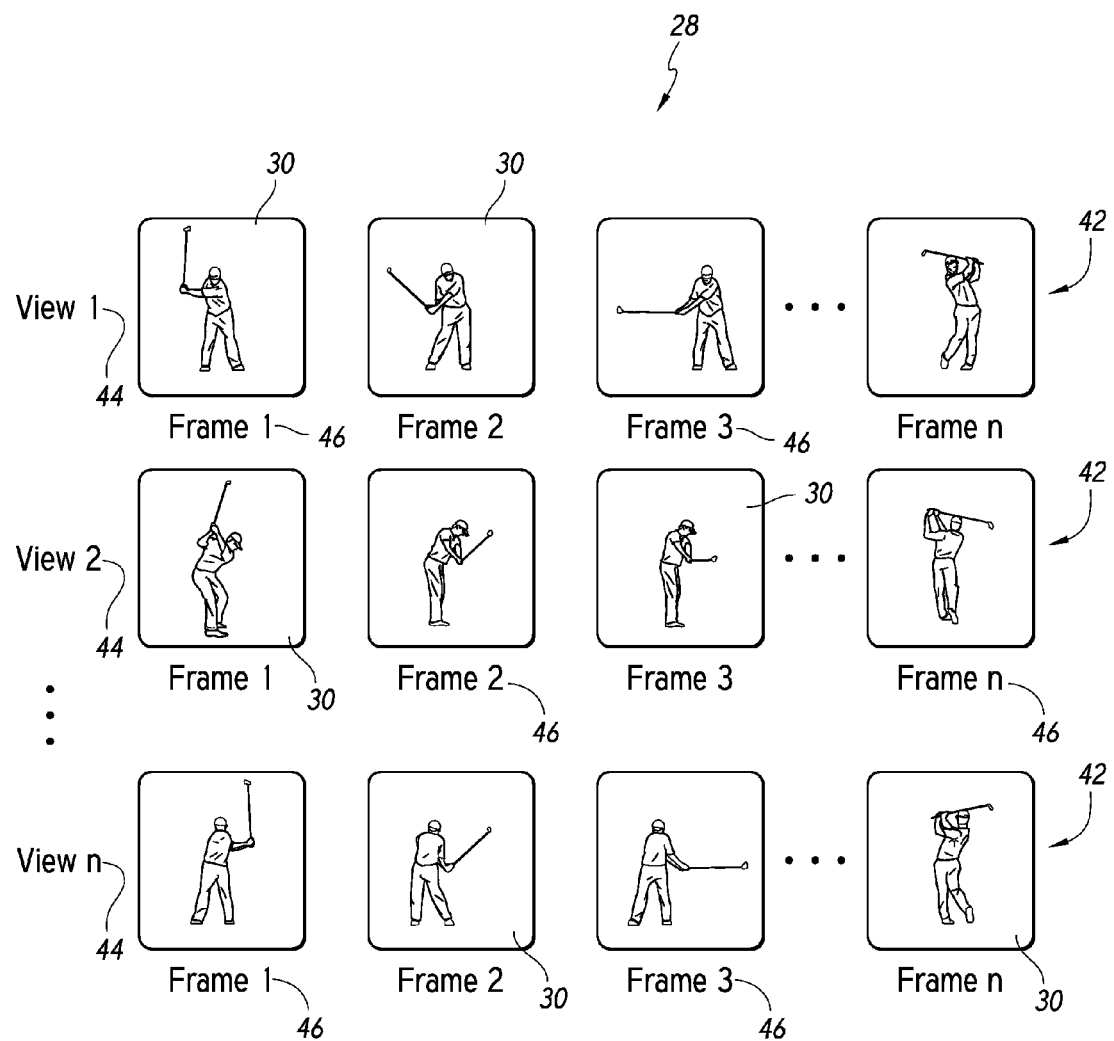
FIG. 3 is an exemplary illustration of an exemplary set of rotatable images, in accordance with at least one embodiment.

As shown in the exemplary illustration of FIG. 3, in at least one embodiment, the at least one image collection 28 comprises a plurality of view sets 42. Each view set 42, in turn, comprises a plurality of images 30 that depict subject matter (such as a golfer swinging a golf club, for example) from a common perspective point and in a sequential format. In other words, each image 30 of a given view set 42 separately depicts a sequential step in the subject matter being conveyed, but from a common view angle. Furthermore, as discussed in detail below, the images 30 of each view set 42 of the image collection 28 depict the same subject matter in the same sequential format, but from a unique perspective point as compared to all other view sets 42 of the image collection 28. In other words, the view sets 42 of a given image collection 28 store parallel sequences of images 30 that depict the same sequentially formatted subject matter, but from different view angles—the importance of which is discussed further below.

With continued reference to FIG. 3, in at least one embodiment, each view set 42 has a view index 44 (preferably numerical and sequentially derived) that is unique as compared to all other view sets 42 in the image collection 28. Similarly, each image 30 within each view set 42 has a frame index 46 (also preferably numerical and sequentially derived) that is unique as compared to all other images 30 in the associated view set 42. Additionally, in at least one embodiment, the images 30 of the view sets 42 that depict the same step in the sequentially formatted subject matter (but from different view angles, of course) share the same frame index 46. These view and frame indices 44 and 46 assist the content module 22 in tracking and displaying the appropriate images 30 at the appropriate perspective point, as discussed further below.

By way of illustration, and continuing with the golf swing example introduced above and shown in FIG. 3, the respective images 30 of each view set 42 of the image collection 28 depicts the golfer's swing in a sequential format, with the image 30 having the frame index 46 of "1" depicting the first step of the swing, and the image 30 having the frame index 46 of "n" depicting the final step of the swing. That is, FIG. 3 depicts each of the view sets 42 comprised of the images 30 arranged in a sequence comprised of single images 30 taken at different steps in a movement sequence such as the first step of the golf swing or the second step of the golf swing. Additionally, the images 30 of each view set 42 depict the same golf swing in the same sequential format, but from a unique perspective point as compared to all other view sets 42 of the image collection 28. Thus, in this particular example, the images 30 of the view set 42 having the view index 44 of "1" depict the golfer's swing from a front view; the images 30 of the view set 42 having the view index 44 of "2" depict the golfer's swing from a right side view; and the images 30 of the view set 42 having the view index 44 of "n" depict the golfer's swing from a rear view. Furthermore, the images 30 of the view sets 42 that depict the same step in the sequentially formatted golf swing (but from different view angles, of course) share the same frame index 46. Thus, for example, the image 30 of each view set 42 having the frame index 46 of "1"

depicts the first step of the swing from the respective view angle, while the image 30 of each view set 42 having the frame index 46 of "n" depicts the final step of the swing from the respective view angle. It should be noted that, depending on the context in which the system 20 is utilized, a given image collection 28 may comprise any number of view sets 42, with said view sets 42 depicting the sequenced subject matter from any desired angle (horizontal or vertical). Furthermore, the view sets 42 may comprise any number of images 30; though, it is preferable that the view sets 42 of a given image collection 28 at least contain the same number of images 30.

With a given image collection 28 structured in such a way as described above, the system 20 is capable of allowing the user to dynamically and selectively choose (via the client device 26) the horizontal and/or vertical angle at which they wish to view the sequenced subject matter at any point during the sequence, thereby providing the user with a 360 degree, selectively "rotatable" view of the sequenced subject matter. Additionally, the system 20 is capable of "synchronizing" the sequenced images 30 to match the view chosen by the user. In other words, in at least one embodiment, using the image collection 28 shown in FIG. 3 as an example, if while viewing the image 30 at frame index 46 "1" of the view set 42 of view index 44 "1," the user chooses (using the at least one image rotation button 38 in the exemplary embodiment) to view the image 30 from the golfer's right side, then the image 30 at frame index 46 "1" of the view set 42 of view index 44 "2" would be displayed in the image window 34 of the user interface 32. Should the user move to the next (or previous) step (i.e., image 30) in the sequence (using the at least one image navigation button 36 in the exemplary embodiment), the image 30 at frame index 46 "2" of the view set 42 of view index 44 "2" (i.e., still from the golfer's right side) would then be displayed in the image window 34. In other words, the view set 42 (i.e., view angle or perspective point) would remain the same unless and until the user decides to choose a different view set 42.

Figure 4:
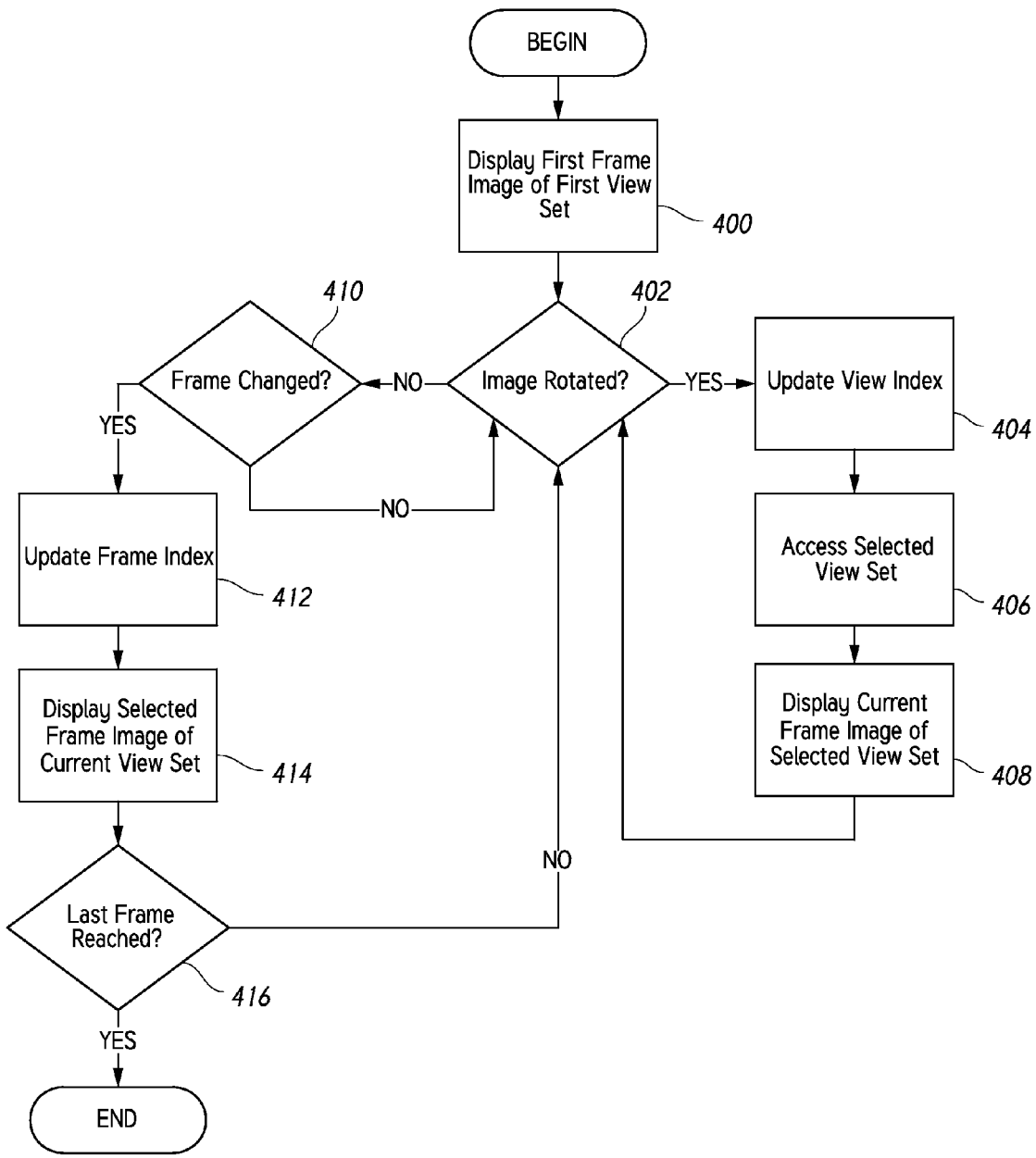
FIG. 4 is a flow diagram of an exemplary method for sequencing rotatable images, in accordance with at least one embodiment.

In at least one embodiment, and as illustrated in the flow diagram of FIG. 4, this functionality is achieved by first, upon the loading of the associated user interface of the content module 22 (as displayed by the client device 26), displaying a first one of the images 30 contained in a first one of the view sets 42 of the associated image collection 28 (400). In the illustration of FIG. 3, this would be the image 30 at frame index 46 "1" of the view set 42 of view index 44 "1." In the event the user chooses to rotate the view angle of the image 30 being displayed (402), the content module 22 updates the view index 44 appropriately (404) and accesses the view set 42 associated with the new view index 44 (406), then displays the image 30 of that view set 42 located at the current frame index 46 (408). Similarly, in the event the user chooses to move to a different image 30 in the sequence (410), the content module 22 updates the frame index 46 appropriately (412) and displays the image 30 of the current view set 42 located at the new frame index 46 (414). In the exemplary embodiment, where the frame indices 46 are numerical and sequential, updating the frame index 46 simply entails incrementing or decrementing the current frame index 46 depending on whether the user chooses to move to the next image 30 or previous image 30 in the sequence, respectively. In alternate embodiments, the frame indices 46 and/or view indices 44 are contained in an at least one lookup table configured for allowing the content module 22 to track and display the appropriate images 30. In still further embodiments, any other means, now known or later developed, capable of tracking and organizing the view and frame indices 44 and 46 may be substituted. This process of allowing the user to selectively traverse and rotate the sequenced images 30 continues until the last frame index 46 is reached (416).

In practice, in at least one embodiment, the at least one image collection 28 is structured as a plurality of folders or directories stored in the image database 24. In a bit more detail, in such an embodiment, each view set 42 occupies a separate folder within which each associated image 30 resides. Additionally, the name of each folder incorporates the view index 44 of the associated view set 42, while the name of each image 30 file incorporates the frame index 46 of the associated image 30. In this way, the content module 22 is able to locate the appropriate image 30 in the folder hierarchy by navigating to the image 30 identified by the frame index 46 and located within the folder identified by the view index 44. In an alternate embodiment, the image collection 28 is structured as a multidimensional array, with each view set 42 stored in a row of the array corresponding to the associated view index 44 and each image 30 of the view set 42 stored in the appropriate column of the array corresponding to the associated frame index 46. In still further embodiments, any other means, now known or later developed, capable of storing and organizing the images 30 of the at least one image collection 28 may be substituted, so long as the system 20 is capable of substantially carrying out the functionality herein described.

To summarize, regarding the exemplary embodiments of the present invention as shown and described herein, it will be appreciated that a system and method for sequencing rotatable images is disclosed. Because the principles of the invention may be practiced in a number of configurations beyond those shown and described, it is to be understood that the invention is not in any way limited by the exemplary embodiments, but is generally directed to a system and method for sequencing rotatable images and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for communicating a sequence of selectively rotatable images depicting desired subject matter, the method comprising the steps of:
    implementing an image database in memory on an at least one computing device, the image database containing an at least one image collection comprising a plurality of view sets, the view sets each having a unique perspective point, the view sets each comprised of a sequence of multiple images comprised of single images taken at different steps in a movement sequence;
    assigning a view index to each view set in the at least one image collection, each view index being unique as compared to all other view sets in the associated image collection;
    assigning a frame index to each image within each view set, each frame index being unique as compared to all other images in the associated view set;
    implementing a content module in memory on an at least one computing device, the content module configured for selectively accessing and displaying images stored in the image database;
    allowing an at least one user to access and interact with the images displayed by the content module using an at least one client device in selective communication with the content module;
    upon the user choosing to rotate the perspective point of the image being displayed, obtaining the view index corresponding to the newly selected perspective point and displaying the image associated with the current frame index located in the view set associated with the new view index; and
    upon the user choosing to display a different image in the view set, obtaining the frame index corresponding to the newly selected image to be displayed and displaying the image associated with the new frame index located in the view set associated with the current view index;
    whereby, the user is capable of dynamically and selectively choosing the common perspective point at which to view the sequentially formatted subject matter at any point in the sequence of images, thereby providing a 360 degree, selectively rotatable view of the subject matter.

2. The method of claim 1, wherein the step of assigning a unique view index to each view set further comprises the step of assigning a numerical and sequentially derived view index to each view set.

3. The method of claim 1, wherein the step of assigning a unique frame index to each image further comprises the step of assigning a numerical and sequentially derived frame index to each image.

4. The method of claim 1, wherein the step of assigning a unique frame index to each image further comprises the step of assigning the same frame index to the images of the view sets that depict the same portion of the sequentially formatted subject matter.

5. The method of claim 1, wherein the step of the user choosing to rotate the perspective point of the image being displayed comprises the further step of obtaining the current frame index of the image being displayed.

6. The method of claim 1, wherein the step of the user choosing to display a different image in the view set comprises the further step of obtaining the current view index of the image being displayed.

7. The method of claim 1, further comprising the step of providing a user interface through which the images are selectively displayed on the client device.

8. The method of claim 7, further comprising the step of hosting the user interface via an at least one Internet-based website accessible by the client device.

9. The method of claim 7, further comprising the step of, upon the loading of the user interface on the client device, displaying a first one of the images contained in a first one of the view sets of the associated image collection.

10. A method for communicating a sequence of selectively rotatable images depicting desired subject matter, the method comprising the steps of:
    implementing an image database in memory on an at least one computing device, the image database containing an at least one image collection comprising a plurality of view sets, the view sets each having a unique perspective point, the view sets each comprised of a parallel sequence of multiple images comprised of single images taken at different steps in a movement sequence;
    assigning a view index to each view set in the at least one image collection, each view index being unique as compared to all other view sets in the associated image collection;
    assigning a frame index to each image within each view set, each frame index being unique as compared to all other images in the associated view set but being identical to corresponding images that depict the same portion of the sequentially formatted subject matter in the other view sets;
    implementing a content module in memory on an at least one computing device, the content module configured for selectively accessing and displaying the images stored in the image database;
    allowing an at least one user to access and interact with the images displayed by the content module using an at least one client device in selective communication with the content module;
    upon the user choosing to rotate the perspective point of the image being displayed, obtaining the current frame index of the image being displayed, obtaining the view index corresponding to the newly selected perspective point, and displaying the image associated with the current frame index located in the view set associated with the new view index; and
    upon the user choosing to display a different image in the view set, obtaining the current view index of the image being displayed, obtaining the frame index corresponding to the newly selected image to be displayed, and displaying the image associated with the new frame index located in the view set associated with the current view index;
    whereby, the user is capable of dynamically and selectively choosing the common perspective point at which to view the sequentially formatted subject matter at any point in the sequence of images, thereby providing a 360 degree, selectively rotatable view of the subject matter.

11. A method for communicating desired subject matter in a step-by-step format to an at least one user via a series of sequential, selectively rotatable images, the method comprising the steps of:

implementing an image database in memory on an at least one computing device, the image database containing an at least one image collection comprising a plurality of view sets, the view sets each having a unique perspective point, each view set comprised of a sequence of multiple images comprised of single images taken at different steps in a movement sequence;

assigning a view index to each view set in the at least one image collection, each view index being unique as compared to all other view sets in the associated image collection;

assigning a frame index to each image within each view set, each frame index being unique as compared to all other images in the associated view set;

implementing a content module in memory on an at least one computing device, the content module configured for selectively accessing and displaying the images stored in the image database;

allowing the at least one user to access and interact with the images displayed by the content module using an at least one client device in selective communication with the content module;

upon the user choosing to rotate the perspective point of the image being displayed, obtaining the view index corresponding to the newly selected perspective point and displaying the image associated with the current frame index located in the view set associated with the new view index; and upon the user choosing to display a different step of the sequentially formatted subject matter, obtaining the frame index corresponding to the newly selected image to be displayed, and displaying the image associated with the new frame index located in the view set associated with the current view index;

whereby, the user is capable of dynamically and selectively choosing the common perspective point at which to view the sequentially formatted subject matter at any step in the sequence of images, thereby providing a 360 degree, selectively rotatable view of the subject matter.

* * * * *